(12) United States Patent

Webb

(10) Patent No.: US 11,022,699 B1
(45) Date of Patent: Jun. 1, 2021

(54) EXTERNAL SOLAR POWER SOURCE FOR GLOBAL POSITIONING SYSTEM (GPS) BASE STATIONS

(71) Applicant: Cory A. Webb, Leander, TX (US)

(72) Inventor: Cory A. Webb, Leander, TX (US)

(*) Notice: Subject to any disclaimer, the term of this patent is extended or adjusted under 35 U.S.C. 154(b) by 220 days.

(21) Appl. No.: 16/198,524

(22) Filed: Nov. 21, 2018

Related U.S. Application Data

(60) Provisional application No. 62/589,817, filed on Nov. 22, 2017.

(51) Int. Cl.
*G01S 19/34* (2010.01)
*H02S 20/30* (2014.01)

(52) U.S. Cl.
CPC .............. *G01S 19/34* (2013.01); *H02S 20/30* (2014.12)

(58) Field of Classification Search
CPC .......... G01S 19/34; G01S 19/24; G01S 19/37; G01S 19/35; G01S 5/0027; H02S 20/30
USPC ..................................... 342/357.74
See application file for complete search history.

(56) References Cited

U.S. PATENT DOCUMENTS

| 5,781,155 A | 7/1998 | Woo et al. |
| 9,088,181 B2 | 7/2015 | Akin et al. |
| 9,236,637 B2 | 1/2016 | Anderson |
| 9,419,472 B2 | 8/2016 | Sells et al. |
| 9,553,481 B2 | 1/2017 | Prommel et al. |
| 2007/0000317 A1 | 1/2007 | Berti |
| 2009/0129067 A1* | 5/2009 | Fan ..................... F21V 23/0435 362/183 |
| 2015/0372641 A1* | 12/2015 | Webber .................. G06F 30/23 703/2 |
| 2017/0373216 A1* | 12/2017 | Anderson .................. C09J 5/06 |
| 2018/0138736 A1 | 5/2018 | Schelhaas et al. |

* cited by examiner

*Primary Examiner* — Harry K Liu
(74) *Attorney, Agent, or Firm* — Scheinberg & Associates, PC; Michael O. Scheinberg

(57) ABSTRACT

Embodiments of the present invention provide an alternate power source through the use of photovoltaic technology that mounts to a bracket that attaches to the tripod underneath the GPS base station. Some embodiments of the present invention include a photovoltaic solar panel battery adapted to provide the GPS base station with a longer operating time window and the ability to conveniently recharge the base station when needed. Additionally, a photovoltaic solar panel battery allows the GPS base station to independently recharge and operate without a traditional external power source.

17 Claims, 7 Drawing Sheets

US 11,022,699 B1

EXTERNAL SOLAR POWER SOURCE FOR GLOBAL POSITIONING SYSTEM (GPS) BASE STATIONS

This application claims priority from U.S. Prov. App. No. 62/589,817, filed Nov. 22, 2017, which is hereby incorporated by reference.

TECHNICAL FIELD OF THE INVENTION

Embodiments of the present invention relate to an external power source for global positioning system (GPS) base stations and more particularly relate to a photovoltaic panel that provides an extended power cycle for GPS base stations.

BACKGROUND OF THE INVENTION

Global Satellite Navigation Systems (GNSS) are systems that use satellites to provide autonomous geo-spatial positioning. Such systems include, but are not limited to, the United States' Global Positioning System (GPS), Russia's GLONASS, the European Union's Galileo, and China's BeiDou. While this disclosure makes reference to GPS for purposes of explanation, it is understood that embodiments of the present invention can be used with other GNSS systems.

GPS technology is commonly used at construction sites to provide accurate location data on the job site. A job site may include one or more base stations that receive GPS signals to provide location data to other equipment on the job site. The base stations can also be used to provide more accurate location information than is available from GPS alone. The GPS base stations are typically powered by batteries. Existing batteries of various types for use on GPS base stations are well known in the construction and GPS industries. The existing technology consists of internal, chargeable batteries. A general shortcoming of these devices is that while they provide a temporary power source, they need to be recharged frequently. These batteries are also not ideal for working in a construction environment where access to power sources is limited and the need for an active power source spans more than the standard technology's existing battery life.

FIG. 6 shows a GPS base station mounted on a tripod using a prior art auxiliary power source. GPS base station 601 connects on top of the tripod assembly 604. To connect an auxiliary power source 603, a user must first connect the power to external power cable 602 of the GPS base station 601. Then the user must connect to external power cable 602 to external battery 603 to power the base station 601, for example, in situations where the internal battery of base station 601 is not holding proper charge. In such situations, a typical ad hoc solution involves using an automobile battery as external battery 603. External battery 603 is connected to external power cable 602 by way of jumper cables. However, this is not an approved method of providing external power to the base station at many work sites.

SUMMARY OF THE INVENTION

Embodiments of the present invention are directed to an alternative power source in which photovoltaic cells are utilized to deliver power to GPS base stations.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF EMBODIMENTS

Embodiments of the present invention are directed to an alternative power source in which photovoltaic cells are utilized to deliver power to Global Positioning System (GPS) base stations. Embodiments of the present invention provide an alternate power source through the use of photovoltaic technology that mounts to a bracket that attaches to the tripod underneath the GPS base station. Some embodiments of the present invention include a photovoltaic solar panel battery adapted to provide the GPS base station with a longer operating time window and the ability to conveniently recharge the base station when needed. Additionally, a photovoltaic solar panel battery allows the GPS base station to independently recharge and operate without a traditional external power source.

The bracket consists of a flat base that fits between the tripod and the GPS base station. The main body of the mount has an open hole to allow the attachment of the base station. The mount angles downward to provide proper exposure to sunrays for the photovoltaic panel. The sun transfers radiant energy to the photovoltaic cells. The photovoltaic cells convert the radiant energy in an electric current. The electric current flows from the photovoltaic cells to the base station through the wiring apparatus with a Society of Automotive Engineers (SAE) connector.

Figure 1:
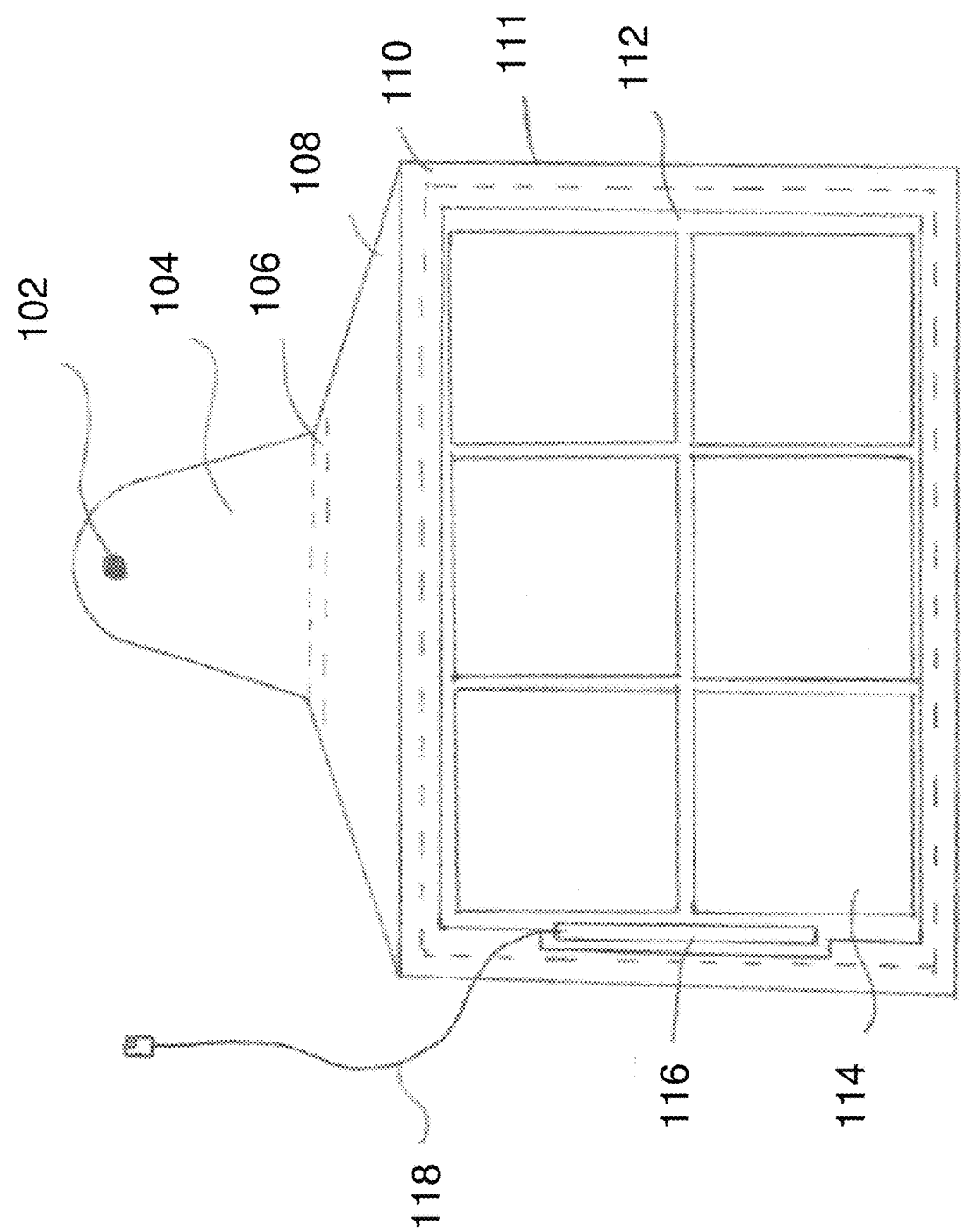
FIG. 1 is a top view of bracket 104 including solar panel 112 for use with a GPS base station in accordance with embodiments of the present invention.

FIG. 1 shows a top view of bracket 104. Bracket 104 is preferably metallic. Bracket 104 includes hole 102 to allow bracket 104 to mount to a pole or tripod device. Bottom section 108 of bracket 104 is supported the bend 106 in bracket 104. Bottom section 108 holds solar panel 112. Solar panel securing bracket 110 can hold solar panel 112 on to the bottom section 108 of bracket 104, for example, by means of adhesive tape 111. Adhesive tape 111 can be added to both the solar panel securing bracket 110 and the bottom section of the bracket 108. Photovoltaic cells 114 convert energy from the sun into a flow of electrons by the photovoltaic effect. Photovoltaic cells 114 of solar panel 112 produce direct current electricity from sunlight which can be used to power a GPS base station and/or charge the battery of a GPS base station. The electricity is collected along multiple photovoltaic cells 114 and then connected to the wire junction box 116. The positive and negative connections of a suitable power cable, such as SAE double stranded cable 118, are electrically connected to the proper terminals in junction box 116.

Figure 2:
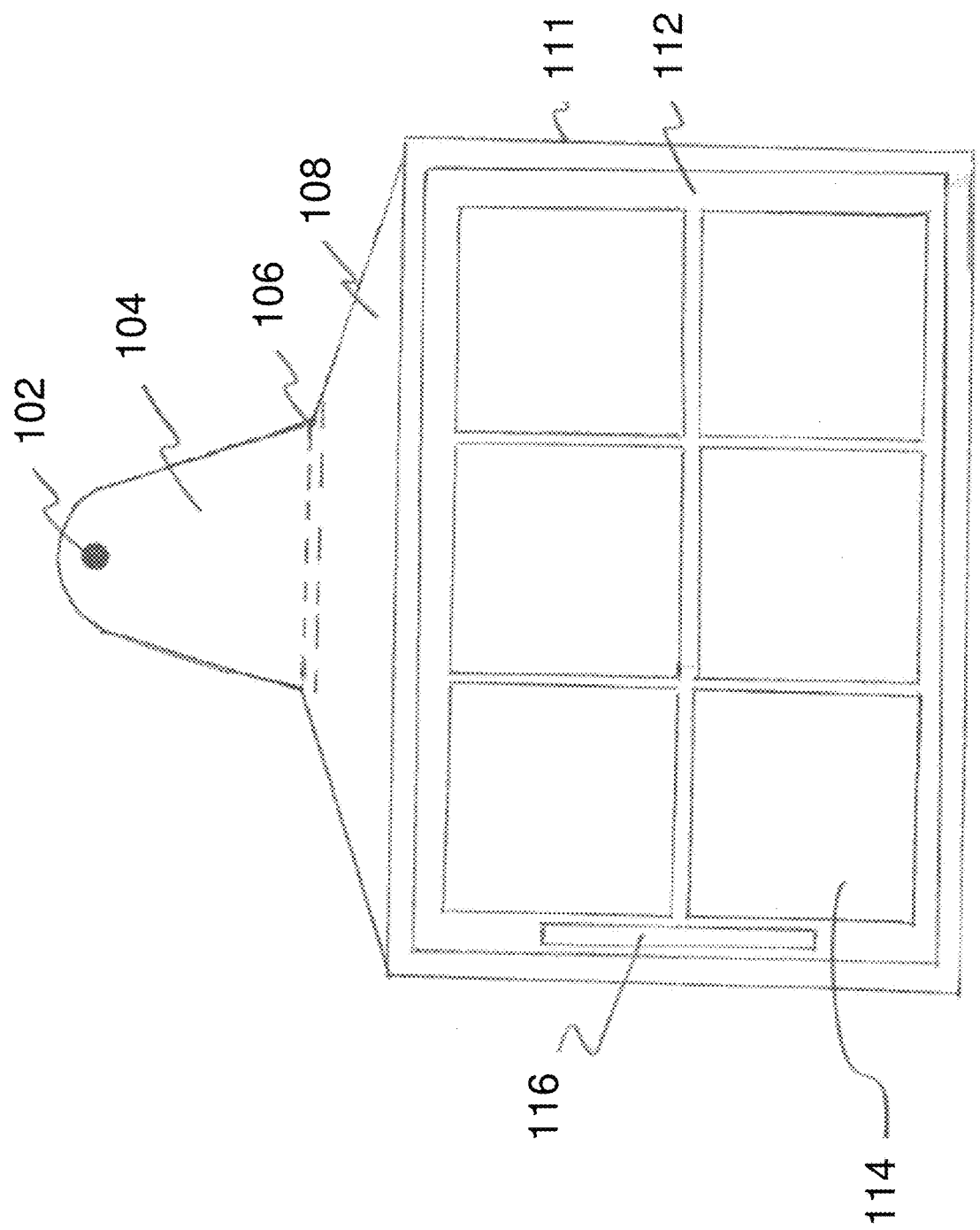
FIG. 2 is a top view the bracket 104 and solar panel 112 without solar panel securing bracket 110.
Figure 3:
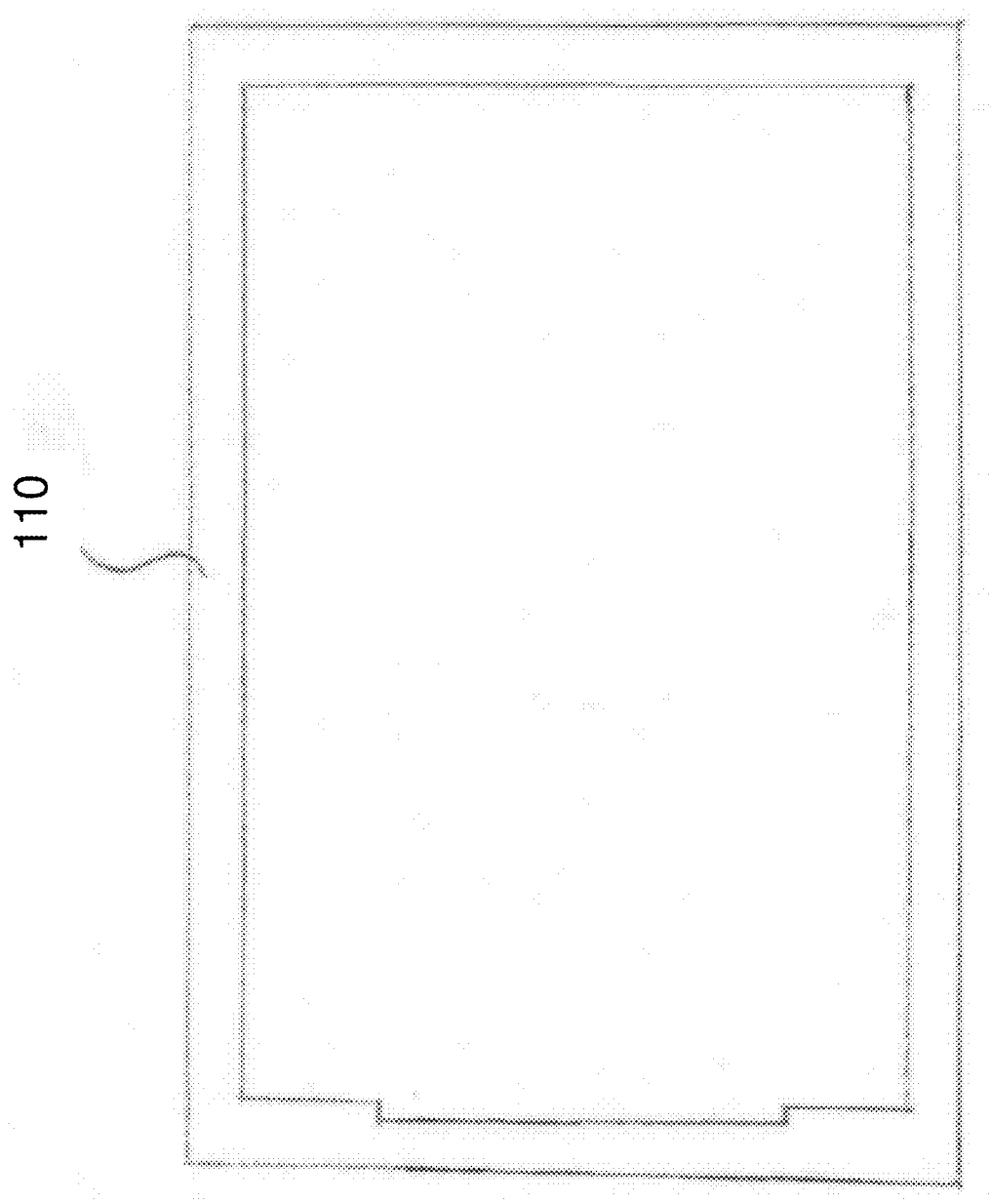
FIG. 3 shows solar panel securing bracket 110.

FIG. 2 shows bracket 104 with the solar panel securing bracket 110 removed. FIG. 3 shows solar panel securing bracket 110 removed from the assembly of FIG. 1.

Figure 4:
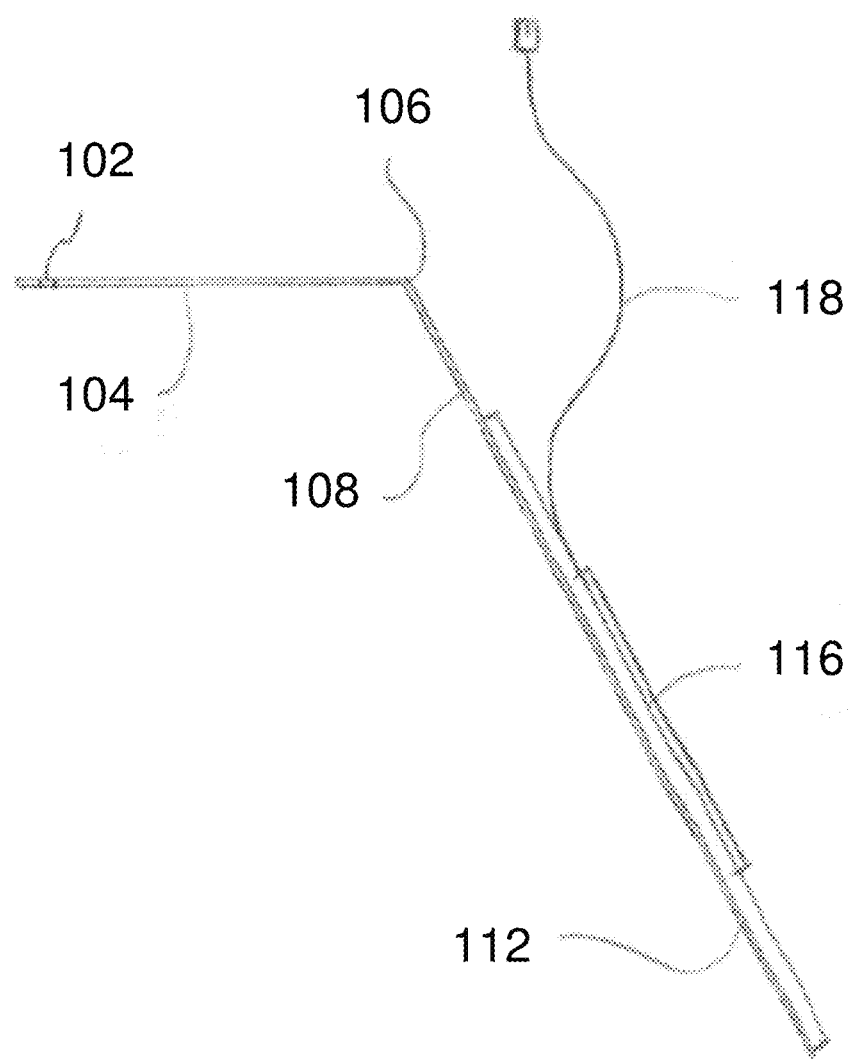
FIG. 4 is a side view of bracket 104 including solar panel 112 for use with a GPS base station in accordance with embodiments of the present invention.

FIG. 4 is a side view of bracket 104 showing the angle of bend 106 in bracket 104 for proper positioning of solar panel 112 to sunlight. Top section of bracket 104 connects through bend 106 in bracket 404 to the bottom section 108 of bracket 104. Bottom section 108 of bracket 104 holds solar panel 112. The electricity produced by solar panel 112 is collected along multiple photovoltaic cells and then connected to the wire junction box 116. The positive and negative connections of the SAE double stranded cable 118 are connected to the proper terminals in junction box 116.

Figure 5:
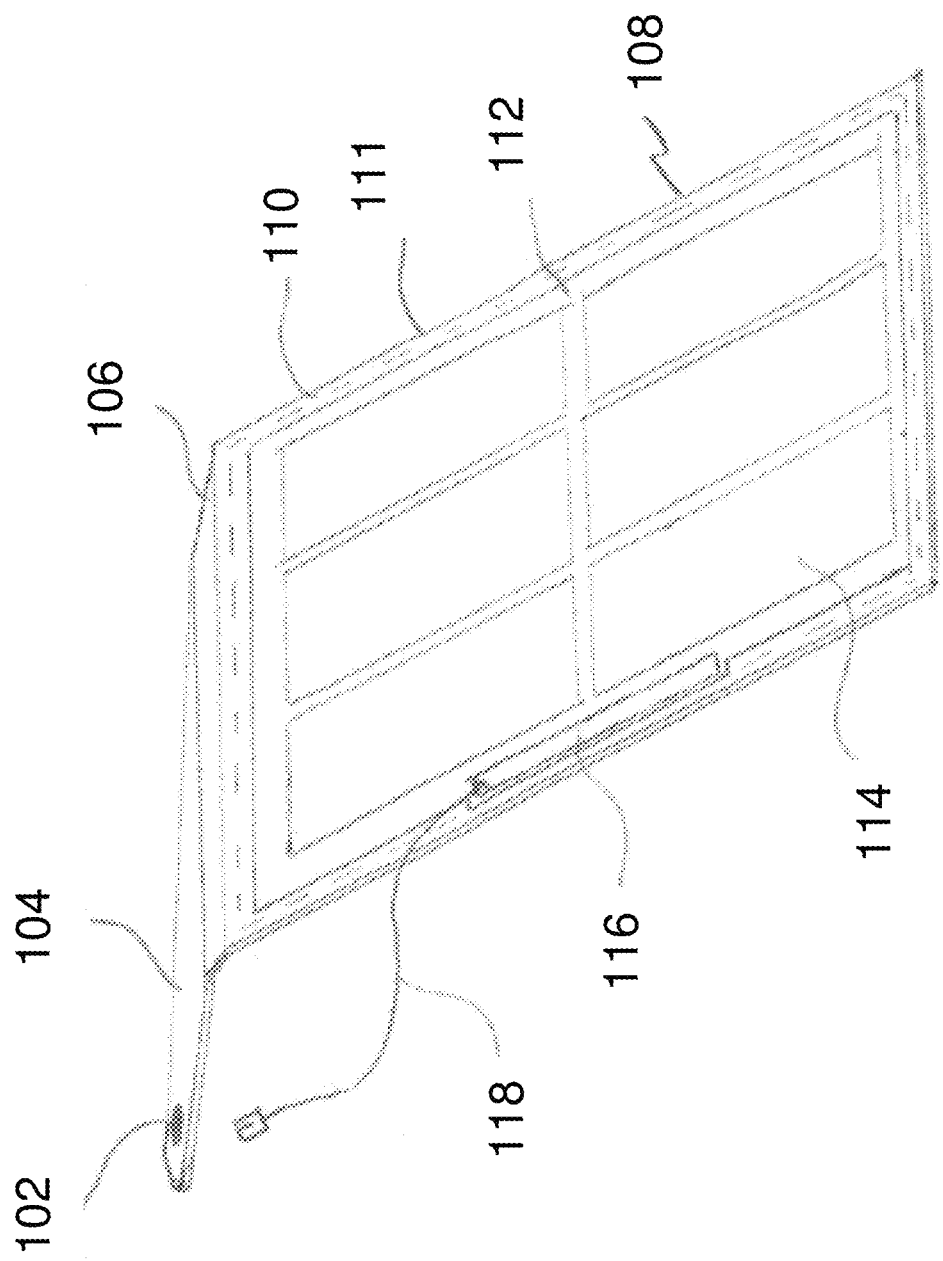
FIG. 5 is the three-dimensional view of bracket 104 including solar panel 112 for use with a GPS base station in accordance with embodiments of the present invention.
Figure 6:
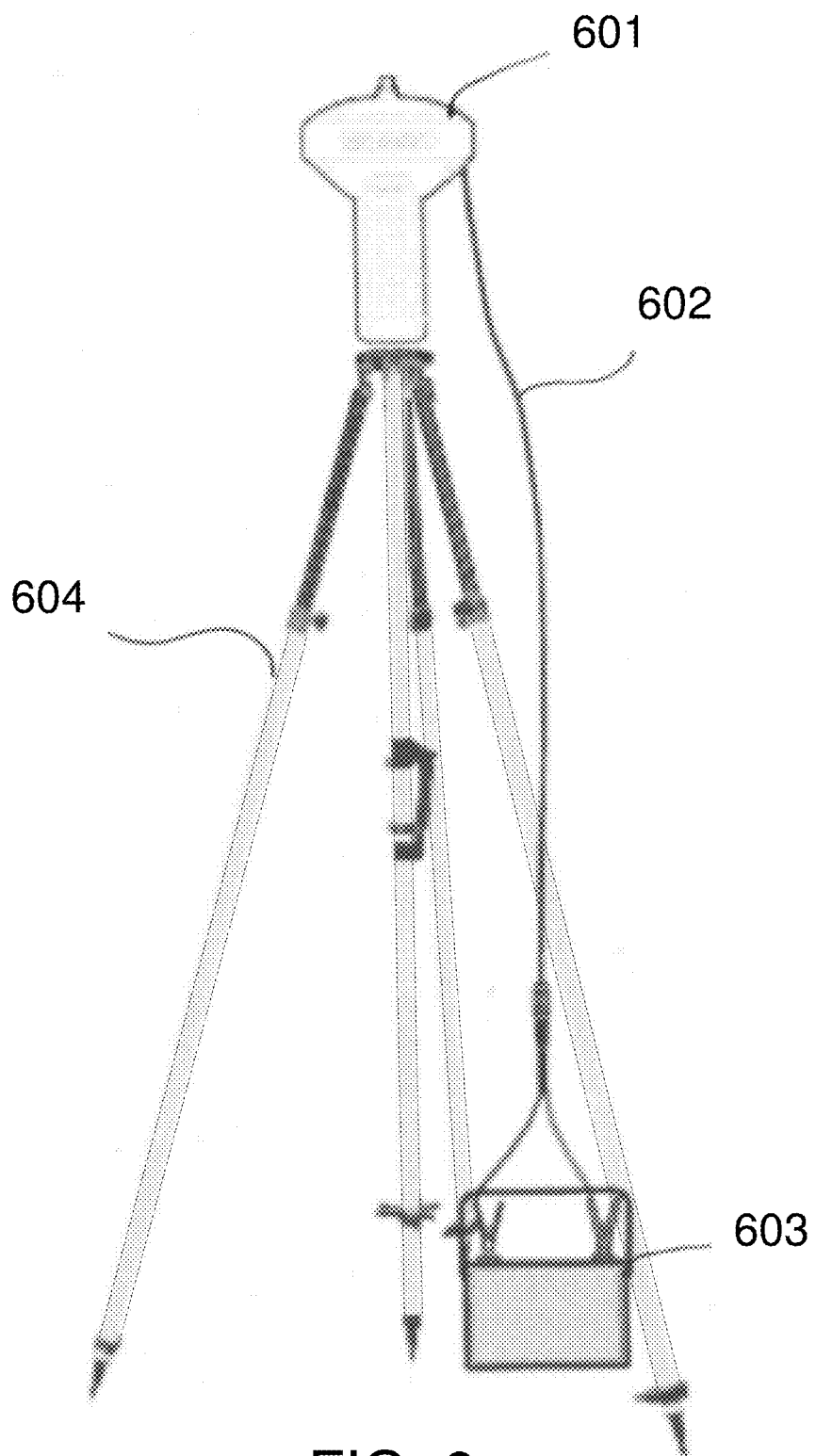
FIG. 6 shows a GPS base station mounted on a tripod using a prior art auxiliary power source.

FIG. 5 shows a three-dimensional view of bracket 104 including solar panel 112.

Bracket 104 includes hole 102 to allow bracket 104 to mount to a pole or tripod device. Bottom section 108 of bracket 104 is supported the bend 106 in bracket 104. Bottom section 108 holds solar panel 112. Solar panel securing bracket 110 can hold solar panel 112 on to the bottom section 108 of bracket 104, for example, by means of adhesive tape 111. Adhesive tape 111 can be added to both the solar panel securing bracket 110 and the bottom section of the bracket 108. The photovoltaic cells 114 convert energy from the sun into a flow of electrons by the photovoltaic effect. Solar cells 112 produce direct current electricity from sunlight which can be used to power a GPS base station and/or charge the battery of a GPS base station. The electricity is collected along a plurality of photovoltaic cells 114 and then connected to the wire junction box 116. The positive and negative connections of the SAE double stranded cable 118 are connected to the proper terminals in junction box 116.

Figure 7:
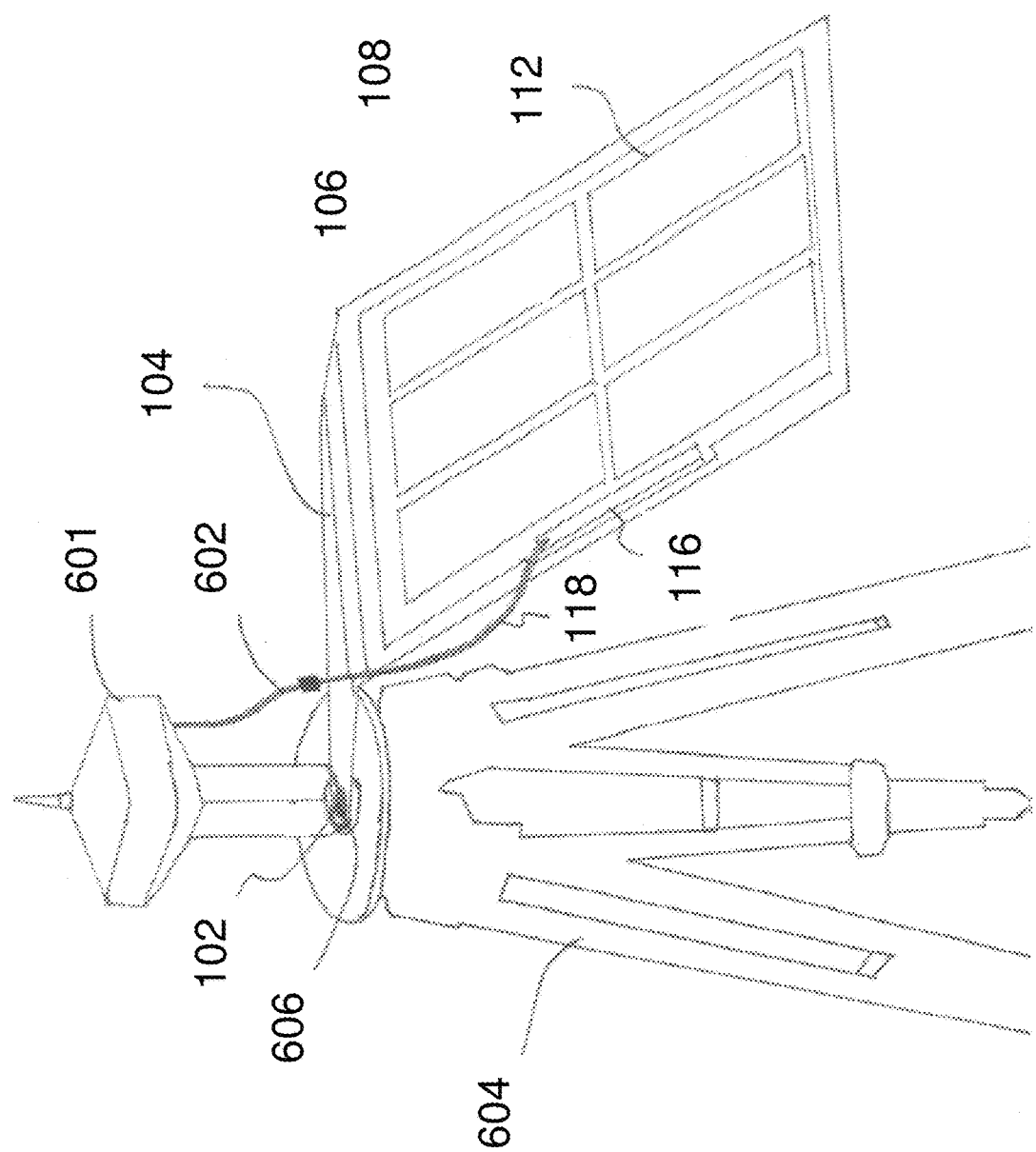
FIG. 7 shows a GPS base station mounted on a tripod in accordance with embodiments of the present invention.

FIG. 7 shows a GPS base station 601 mounted on a tripod 604 in accordance with embodiments of the present invention. GPS base station 601 connects on top of the tripod assembly 604 by way of a fastener inserted through hole 102 of bracket 104. To connect solar panel bracket 104 to the tripod assembly 604, the user places bracket 104 in line with the threaded bolt of tripod assembly 604. To electrically connect solar panel 112 to GPS base station 601, the user connects external power cable 602 to the GPS base station 601. The user also connects external power cable 602 to SAE double-stranded cable 118. SAE double-stranded cable 118 is electrically connected to the proper terminals in junction box 116 to provide electric current from solar panel 112 to GPS base station 601. In one embodiment, the electric current from solar panel 112 can be used to provide the electric power needed to operate GPS base station 601. In another embodiment, the electric current from solar panel 112 can be used to recharge the internal batteries of GPS base station 601. In another embodiment, the electric current from solar panel 112 can be used to provide the electric power needed to operate GPS base station 601 and to recharge the internal batteries of GPS base station 601 simultaneously.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim as follows:

1. A Global Positioning System (GPS) base station, comprising:
    a GPS base station configured to provide location data to other equipment at a job site;
    a mounting bracket mounted to the GPS base station, the mounting bracket including:
        a bend;
        a first portion above the bend, the first portion including a hole adapted for attaching the mounting bracket to the GPS base station;
        a lower portion below the bend, the lower portion adapted for mounting a solar panel;
    a solar panel positioned on the lower portion of the bracket;
    a solar panel securing bracket securing the solar panel to the lower portion of the mounting bracket; and
    an electrical power cable connecting the solar panel to the GPS base station,
    wherein the bend facilitates positioning the solar panel to sunlight.

2. The GPS base station of claim 1 further comprising a GPS base station battery.

3. The GPS base station of claim 2 in which the battery is adapted to power the GPS base station and/or charge the battery of a GPS base station battery.

4. The GPS base station of claim 1 further comprising a photovoltaic solar panel battery adapted to provide the GPS base station with a longer operating time window and to recharge the base station battery.

5. The GPS base station of claim 1 further comprising a junction box for collecting power from the solar panel and providing power to the GPS base station.

6. The GPS base station of claim 1 in which the solar panel provides power to only the GPS base station.

7. The GPS base station of claim 1 in which the GPS base station is configured to provide location data to other equipment away from the GPS base station at the job site.

8. The GPS base station of claim 1 in which the GPS base station is configured to provide location data to other location determining equipment at a job site.

9. The GPS base station of claim 1 in which the GPS base station is positioned on a known location to collect data for differential correction.

10. The GPS base station of claim 1 in which the GPS base station provides location data to one or more additional GPS units.

11. A Global Positioning System (GPS) base station comprising:
a GPS base station;
a mounting bracket mounted to the GPS base station, the mounting bracket including:
a bend;
a first portion above the bend, the first portion including a hole adapted for attaching the mounting bracket to the GPS base station;
a lower portion below the bend, the lower portion adapted for mounting a solar panel;
a solar panel positioned on the lower portion of the bracket;
a solar panel securing bracket securing the solar panel to the lower portion of the mounting bracket;
adhesive tape securing the solar panel to the solar panel securing bracket; and
an electrical power cable connecting the solar panel to the GPS base station,
wherein the bend facilitates positioning the solar panel to sunlight.

12. A photovoltaic power source for a GPS base station, comprising:
a mounting bracket mounted to the GPS base station, the GPS base station configured to provide location data to other equipment at a job site, the mounting bracket including:
a bend;
a first portion above the bend, the first portion including a hole adapted for mounting the mounting bracket to the GPS base station;
a lower portion below the bend, the lower portion adapted for mounting a solar panel;
a solar panel positioned on the lower portion of the bracket; and
a solar panel securing bracket securing the solar panel to the lower portion of the mounting bracket,
wherein the bend facilitates positioning the solar panel to sunlight.

13. The photovoltaic power source for a GPS base station of claim 12 further comprising a junction box for collecting electricity from the solar panel.

14. The photovoltaic power source for a GPS base station of claim 12 further comprising a photovoltaic solar panel battery adapted to provide the GPS base station with a longer operating time window and to recharge the base station battery.

15. The photovoltaic power source for a GPS base station of claim 12 in which the solar panel provides power to only the GPS base station.

16. A photovoltaic power source for a GPS base station, comprising:
a mounting bracket mounted to the GPS base station, the mounting bracket including:
a bend;
a first portion above the bend, the first portion including a hole adapted for mounting the mounting bracket to the GPS base station; and
a lower portion below the bend, the lower portion adapted for mounting a solar panel;
a solar panel positioned on the lower portion of the bracket;
adhesive tape securing the solar panel to the solar panel securing bracket; and
a solar panel securing bracket securing the solar panel to the lower portion of the mounting bracket,
wherein the bend facilitates positioning the solar panel to sunlight.

17. A method of providing electric power to a GPS base station, comprising:
providing a photovoltaic power source for a GPS base station, the GPS base station comprising;
a mounting bracket mounted to the GPS base station, the mounting bracket including:
a bend;
a first portion above the bend, the first portion including a hole adapted for mounting the mounting bracket to the GPS base station; and
a lower portion below the bend, the lower portion adapted for mounting a solar panel;
a solar panel positioned on the lower portion of the bracket; and
a solar panel securing bracket securing the solar panel to the lower portion of the mounting bracket,
wherein the bend facilitates positioning the solar panel to sunlight;
connecting the photovoltaic power source to the GPS base station using a fastener inserted through the hole in the mounting bracket; and
connecting an electrical cable from a junction box on the photovoltaic power source to the GPS base station.

* * * * *